(12) United States Patent
Horng et al.

(10) Patent No.: US 10,673,302 B2
(45) Date of Patent: Jun. 2, 2020

(54) OUTER-ROTOR MOTOR AND STATOR ASSEMBLY THEREOF

(71) Applicant: Sunonwealth Electric Machine Industry Co., Ltd., Kaohsiung (TW)

(72) Inventors: Alex Horng, Kaohsiung (TW); Tso-Kuo Yin, Kaohsiung (TW); Chi-Min Wang, Kaohsiung (TW)

(73) Assignee: SUNONWEALTH ELECTRIC MACHINE INDUSTRY CO., LTD., Kaohsiung (TW)

( * ) Notice: Subject to any disclaimer, the term of this patent is extended or adjusted under 35 U.S.C. 154(b) by 53 days.

(21) Appl. No.: 15/662,351

(22) Filed: Jul. 28, 2017

(65) Prior Publication Data

US 2018/0091020 A1    Mar. 29, 2018

(30) Foreign Application Priority Data

Sep. 29, 2016    (TW) .............................. 105131336 A

(51) Int. Cl.
| | |
|---|---|
| *H02K 7/08* | (2006.01) |
| *H02K 5/16* | (2006.01) |
| *H02K 5/173* | (2006.01) |
| *H02K 21/22* | (2006.01) |
| *H02K 1/27* | (2006.01) |

(52) U.S. Cl.
CPC .......... *H02K 7/086* (2013.01); *H02K 1/2786* (2013.01); *H02K 5/1735* (2013.01); *H02K 7/085* (2013.01); *H02K 21/22* (2013.01); *H02K 2213/03* (2013.01)

(58) Field of Classification Search
CPC .............................. H02K 1/2786; H02K 7/086
USPC ............................................................ 310/90
See application file for complete search history.

(56) References Cited

U.S. PATENT DOCUMENTS

| | | | | |
|---|---|---|---|---|
| 4,612,468 A | * | 9/1986 | Sturm .................. | H02K 5/1675 310/67 R |
| 4,638,201 A | * | 1/1987 | Feigel ..................... | H02K 5/173 310/156.26 |
| 5,264,748 A | * | 11/1993 | Ootsuka .................. | F16C 17/04 310/90 |
| 5,562,347 A | * | 10/1996 | Hsieh ...................... | F16C 35/02 384/215 |

(Continued)

FOREIGN PATENT DOCUMENTS

| | | |
|---|---|---|
| CN | 101056017 A | 10/2007 |
| CN | 101728893 A | 6/2010 |

*Primary Examiner* — Burton S Mullins
(74) *Attorney, Agent, or Firm* — Alan D. Kamrath; Karin L. Williams; Mayer & Williams PC

(57) ABSTRACT

An outer-rotor motor and a stator assembly of the motor solve the problems which exist in a conventional outer-rotor motor during the insertion of the bearings into the shaft tubes. The stator assembly of the outer-rotor motor includes a lower bearing seat, an iron core and an upper bearing seat. The lower bearing seat has a shaft tube. The iron core has an engagement channel and is coupled with the lower bearing seat. The upper bearing seat has a fixing portion, and the upper bearing seat abuts against the iron core. The shaft tube extends into the engagement channel at a first end of the engagement channel, and the fixing portion extends into the engagement channel at a second end of the engagement channel. Thus, the iron core is coupled with each of the lower and upper bearing seats.

13 Claims, 9 Drawing Sheets

(56) References Cited

U.S. PATENT DOCUMENTS

| | | | | |
|---|---|---|---|---|
| 6,023,117 A | * | 2/2000 | Chen | F04D 25/0613 |
| | | | | 310/68 R |
| 6,271,611 B1 | * | 8/2001 | Taniguchi | F04D 29/057 |
| | | | | 310/89 |
| 7,622,838 B2 | * | 11/2009 | Watanabe | F04D 25/082 |
| | | | | 310/67 R |
| 7,905,661 B2 | * | 3/2011 | Horng | F16C 17/04 |
| | | | | 384/100 |
| 8,113,781 B2 | * | 2/2012 | Chang | F16C 19/54 |
| | | | | 415/111 |
| 10,205,356 B2 | | 2/2019 | Horng et al. | |
| 2013/0221782 A1 | * | 8/2013 | Yoo | H02K 5/1675 |
| | | | | 310/90 |

* cited by examiner

OUTER-ROTOR MOTOR AND STATOR ASSEMBLY THEREOF

CROSS REFERENCE TO RELATED APPLICATIONS

The application claims the benefit of Taiwan application serial No. 105131336, filed on Sep. 29, 2016, and the entire contents of which are incorporated herein by reference.

BACKGROUND OF THE INVENTION

1. Field of the Invention

The present invention generally relates to an outer-rotor motor and, more particularly, to an outer-rotor motor whose shaft tube does not receive a bearing, as well as a stator assembly of the outer-rotor motor.

2. Description of the Related Art

FIG. 1 shows a conventional outer-rotor motor 9 including a base 91, two bearings 92, a stator 93 and a rotating member 94. The base 91 includes a shaft tube 911 receiving the two bearings 92. The stator 93 is coupled with an outer periphery of the shaft tube 911, such that the bearings 92 and the stator 93 are aligned with each other in a radial direction of the shaft tube 911. The rotating member 94 includes a shaft 941 extending into the shaft tube 911 and rotatably coupled with the bearings 92.

In the above structure, since the bearings 92 need to be mounted to predetermined locations relative to the shaft tube 911 and the rotating member 94, the assembly procedure of the outer-rotor motor 9 is more complex. In addition, since the bearings 92 are received in the shaft tube 911 and are radially aligned with the stator 93, the diameter of the shaft tube 911 cannot be reduced. As a result, to provide greater power, it would be necessary to increase the overall radial dimension of the outer-rotor motor 9 in order to increase the number of turns of the coil of the stator 93. However, if the available space for installation of the motor does not have a sufficient radial range (such as in a drone, which requires a motor with a small volume and high power), the outer-rotor motor 9 can no longer be used. Thus, it is necessary to improve the conventional outer-rotor motor 9.

SUMMARY OF THE INVENTION

It is therefore an objective of this invention to provide an outer-rotor motor and a stator assembly thereof which not only allow for convenient assembly of the bearings, and also provide a maximal winding space to increase the torque of the motor without changing the overall radial dimension of the motor.

A stator assembly of an outer-rotor motor includes a lower bearing seat, an iron core and an upper bearing seat. The lower bearing seat has a shaft tube. The iron core has an engagement channel and is coupled with the lower bearing seat. The upper bearing seat has a fixing portion and abuts against the iron core. The shaft tube extends into the engagement channel at a first end of the engagement channel, and the fixing portion extends into the engagement channel at a second end of the engagement channel. The iron core is coupled with both the upper and lower bearing seats. Therefore, the outer-rotor motor is able to provide a convenient assembly of the bearings.

In an example, the outer-rotor motor further comprises a first bearing mounted to the lower bearing seat and a second bearing mounted to the upper bearing seat.

In an example, the lower bearing seat includes an open end located at an end of the shaft tube and in the engagement channel.

In an example, the upper bearing seat includes an open end located in the engagement channel.

In an example, the first bearing and the second bearing are located outside the engagement channel. This structure can increase the torque of the motor by increasing the winding space without changing the maximal diameter of the stator assembly. Although it is required to change the sizes of the first bearing and the second bearing, it will not affect the number of turns of the winding. Furthermore, since the upper bearing seat abuts with the iron core, the second bearing can be securely received in the upper bearing seat, preventing the second bearing from displacing relative to the iron core and ensuring a stable coupling effect of the second bearing.

In an example, the shaft tube extends into the engagement channel at the first end of the engagement channel, the first bearing has a diameter in a radial direction perpendicular to the shaft tube, and the diameter of the first bearing is larger than a diameter of the first end of the engagement channel in the radial direction. This structure can provide an enhanced coupling effect between the stator assembly and the rotor assembly.

In an example, the fixing portion extends into the engagement channel at the second end of the engagement channel, the second bearing has a diameter in a radial direction perpendicular to the shaft tube, and the diameter is larger than a diameter of the second end of the engagement channel in the radial direction. This structure can provide an enhanced coupling effect between the stator assembly and the rotor assembly.

In an example, the shaft tube extends into the engagement channel at the first end of the engagement channel. The lower bearing seat includes a first bearing chamber located outside the engagement channel, and the first bearing is received in the first bearing chamber. The first bearing chamber has a diameter in a radial direction perpendicular to the shaft tube, and the diameter is larger than a diameter of the first end of the engagement channel in the radial direction.

In an example, the fixing portion extends into the engagement channel at the second end of the engagement channel. The upper bearing seat includes a second bearing chamber located outside the engagement channel, and the second bearing is received in the second bearing chamber. The second bearing chamber has a diameter in a radial direction perpendicular to the shaft tube, and the diameter is larger than a diameter of the second end of the engagement channel in the radial direction.

In an example, the iron core includes an inner periphery forming the engagement channel, and the shaft tube and the fixing portion are press fit with the inner periphery of the iron core. The structure can position the lower bearing seat and the upper bearing seat with respect to the iron core.

In an example, the iron core includes an inner periphery forming the engagement channel, and an adhesion layer is formed between the inner periphery of the iron core and an outer periphery of the shaft tube.

In an example, the iron core includes an inner periphery forming the engagement channel, and an adhesion layer is formed between the inner periphery of the iron core and an outer periphery of the fixing portion.

In an example, the shaft tube and the fixing portion are spaced from each other in an axial direction of the shaft tube. This structure allows the upper bearing seat to firmly couple with the iron core.

In an example, the upper bearing seat includes an open end located in the engagement channel. The open end of the lower bearing seat forms an inner top face and an outer top face in a radial direction perpendicular to the axial direction of the shaft tube, and the open end of the upper bearing seat further forms an inner face and an outer face in the radial direction perpendicular to the axial direction of the shaft tube. The inner face faces the inner top face and the outer face faces the outer top face. This structure can provide a reinforced coupling effect among the lower bearing seat, the iron core and the upper bearing seat.

In an example, the upper bearing seat includes an open end located in the engagement channel. The shaft tube has an outer periphery forming at least one first top face and at least one second top face alternating with the at least one first top face at the open end of the lower bearing seat. The fixing portion has an outer periphery forming at least one toothed top and at least one toothed bottom alternating with the at least one toothed top at the open end of the upper bearing seat. The toothed top faces the first top face and the toothed bottom faces the second top face. This structure can provide a reinforced coupling effect among the lower bearing seat, the iron core and the upper bearing seat.

In an example, the shaft tube extends into the engagement channel via the first end of the engagement channel. The lower bearing seat forms an engagement shoulder on an outer periphery of the shaft tube, and the iron core includes a side forming the first end of the engagement channel and abutting with the engagement shoulder. This structure allows the iron core to be securely disposed on the lower bearing seat.

In an example, the upper bearing seat includes a receiving portion connected to the fixing portion, located outside the engagement channel, and the upper bearing seat abuts against the iron core.

In an example, the upper bearing seat includes an inclined inner guiding face formed on an inner periphery of the upper bearing seat, and the inclined inner guiding face is in a form of an annular face having a diameter gradually reduced from the receiving portion to the fixing portion. This structure allows the shaft to be more easily inserted through the engagement channel.

In an example, no bearing is received in the engagement channel. This structure provides a convenient assembly of the stator assembly and a convenient replacement among different-sized bearings, and increases the winding space to increase the torque of the motor and to prolong the service life of the motor without changing the maximal diameter of the stator assembly.

In an example, the open end of the upper bearing seat includes an outer inclined guiding face. This structure allows the upper bearing seat to be more smoothly inserted into the engagement channel.

In an example, the iron core includes an insulating sleeve having a face facing the upper bearing seat and forming a lateral wall portion, and the second bearing abuts against the lateral wall portion.

In an example, the upper bearing seat includes a receiving portion in a form of a circular board. The receiving portion is connected to the fixing portion, located outside of the engagement channel, and abuts against the iron core. The receiving portion and the lateral wall portion jointly receive the second bearing.

In another example, an outer-rotor motor includes the stator assembly as described above, and a rotor assembly. The rotor assembly includes a shaft, a housing and a magnet portion. The shaft is coupled with the first bearing and the second bearing. The housing is coupled with the shaft, and the magnet portion is coupled with the housing and aligned with the iron core. The shaft includes an extension section extending through the engagement channel and the first bearing. The extension section has a maximal diameter smaller than a minimal diameter of each of the shaft tube and the fixing portion. The structure can prevent the friction between the shaft and the shaft tube and the fixing portion from affecting the rotation of the shaft.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
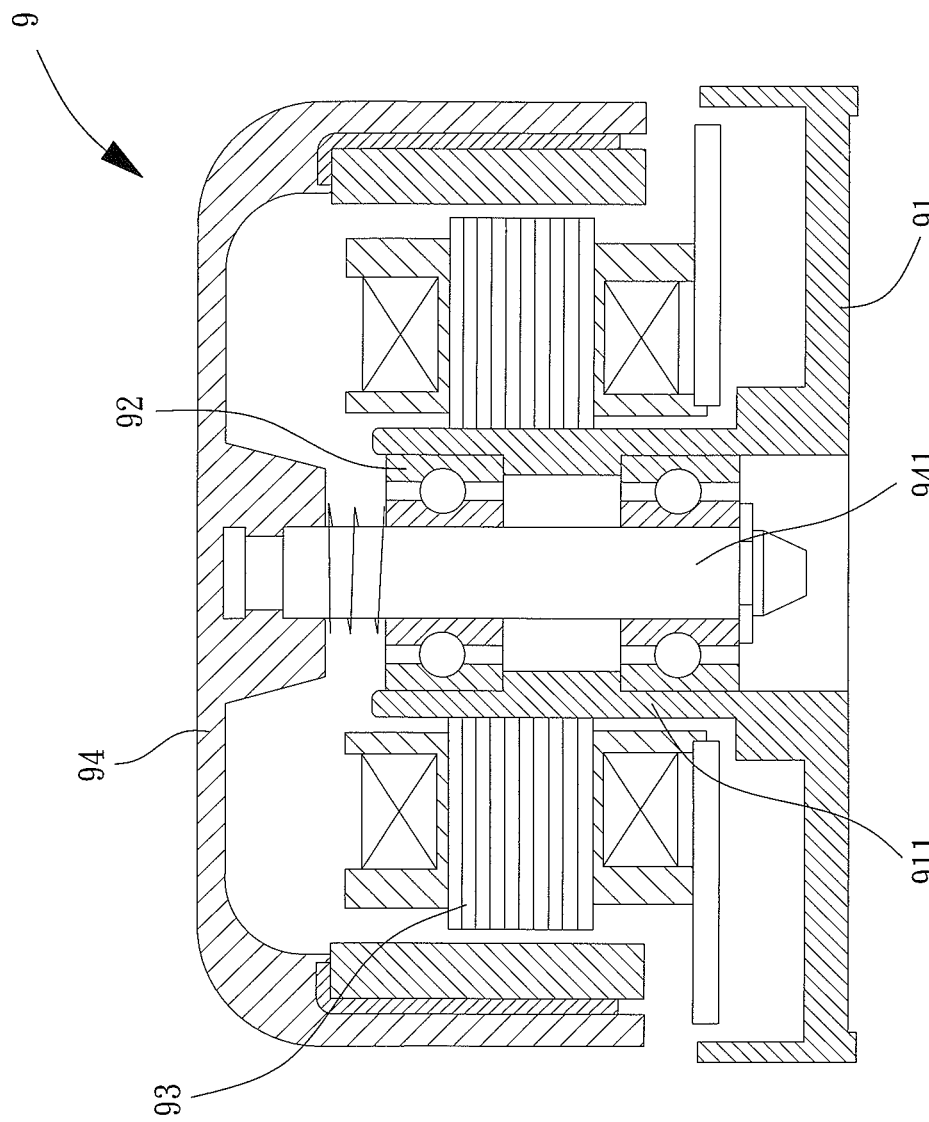
FIG. 1 is a cross sectional view of a conventional outer-rotor motor.

In the various figures of the drawings, the same numerals designate the same or similar parts. Furthermore, when the terms "first", "second", "inner", "outer", "top", "bottom", "axial", "radial", "length" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
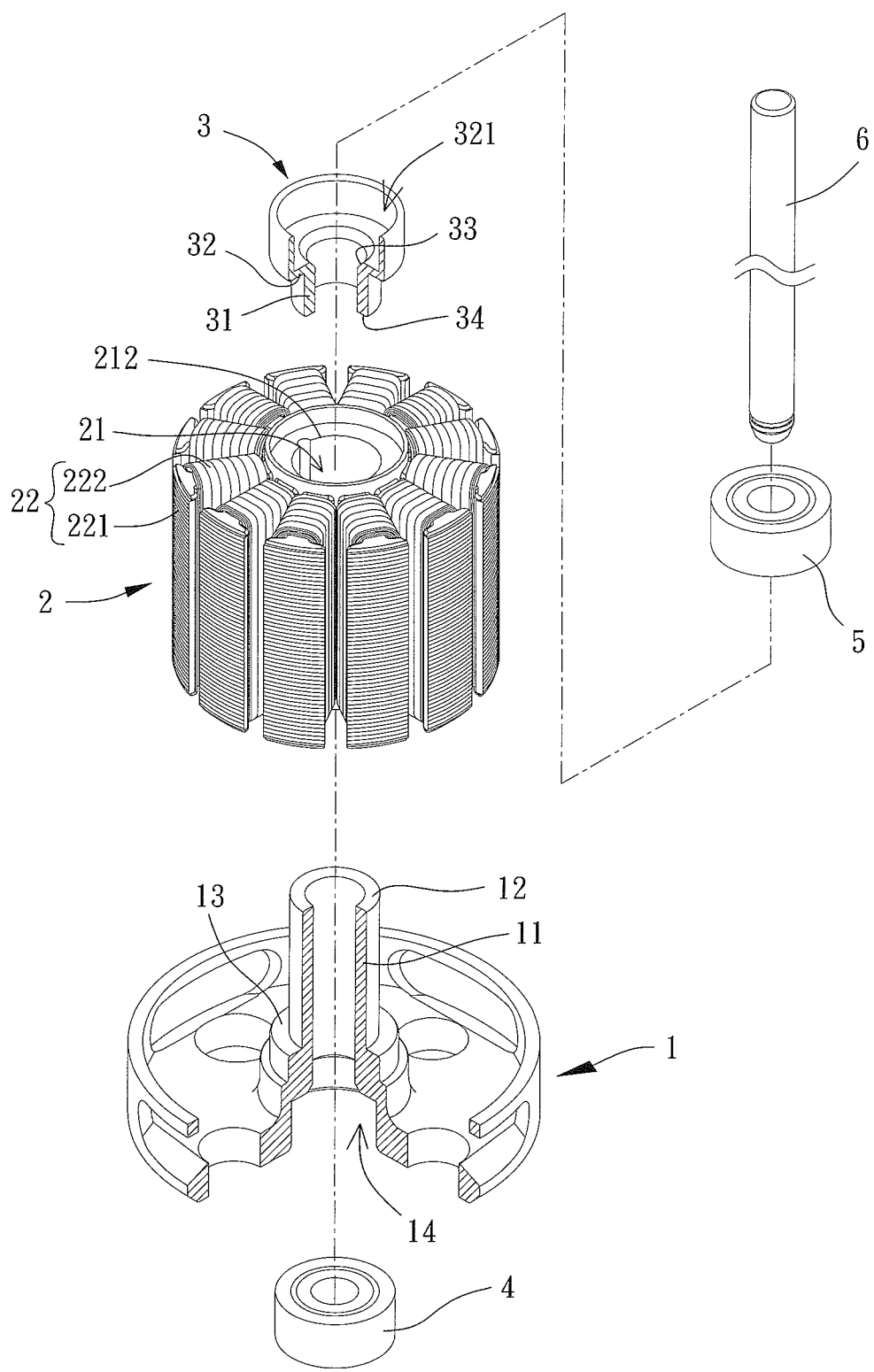
FIG. 2 is an exploded, perspective view of a stator assembly and a portion of a rotor assembly of an outer-rotor motor according to a first embodiment of the invention.
Figure 3:
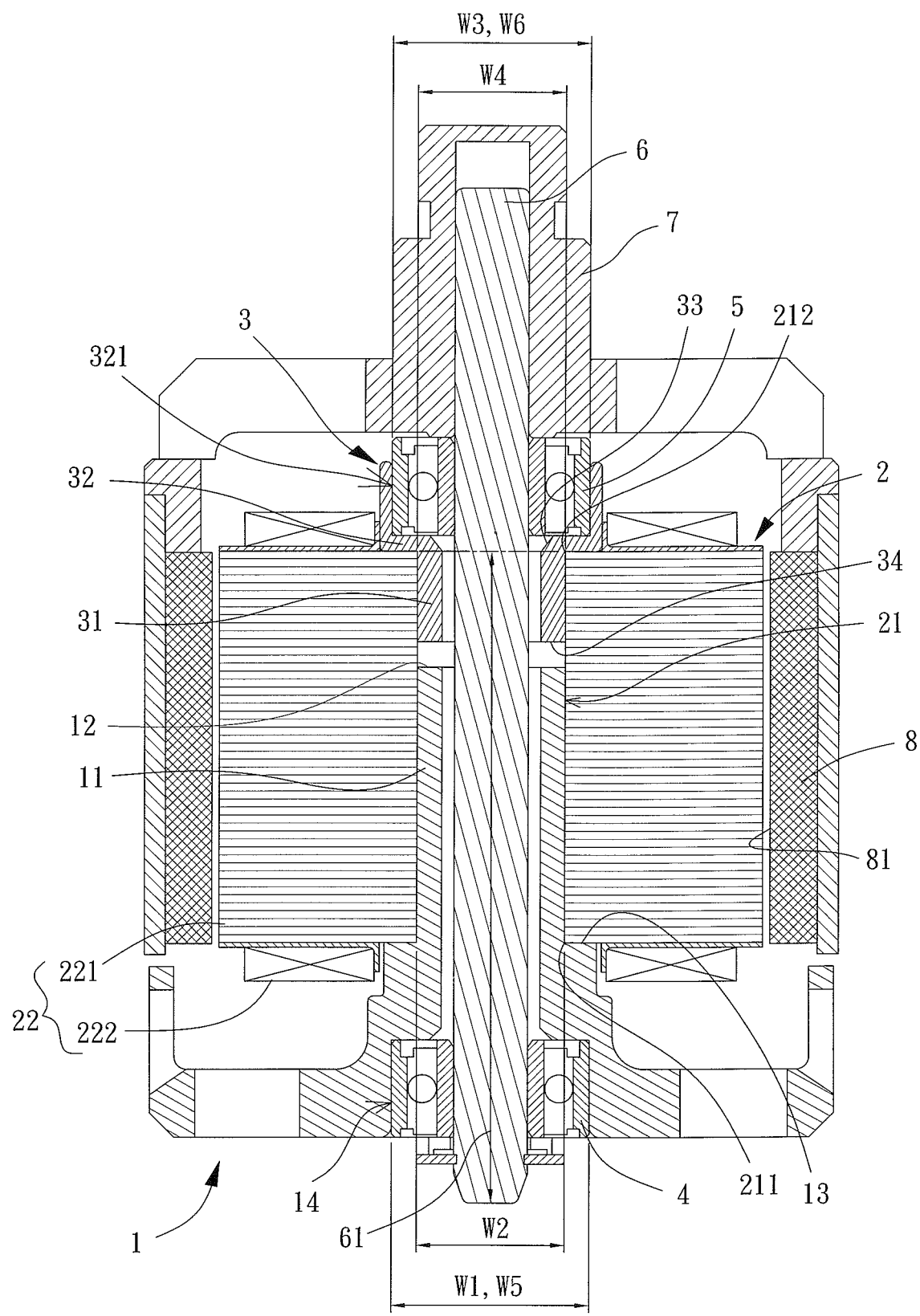
FIG. 3 is a cross sectional view of the outer-rotor motor according to the first embodiment of the invention after assembly.

FIGS. 2 and 3 show an outer-rotor motor according to a first embodiment of the invention. The outer-rotor motor includes a stator assembly and a rotor assembly. The stator assembly includes a lower bearing seat 1, an iron core 2, an upper bearing seat 3, a first bearing 4 and a second bearing 5. The lower bearing seat 1 and the upper bearing seat 3 are coupled with the iron core 2. The first bearing 4 is coupled with the lower bearing seat 1. The second bearing 5 is coupled with the upper bearing seat 3. The rotor assembly includes a shaft 6, a housing 7 and a magnet portion 8. The shaft 6 is coupled with the first bearing 4 and the second bearing 5. The housing 7 is coupled with the shaft 6, and the magnet portion 8 is coupled with the housing 7 and is aligned with the iron core 2.

Specifically, the lower bearing seat 1 includes a shaft tube 11 extending in an axial direction. The lower bearing seat 1 includes a first open end 12 at a first end of the shaft tube 11, as well as an engagement shoulder 13 on the outer periphery of the shaft tube 11. The lower bearing seat 1 is preferably made of a metal material. In addition, the lower bearing seat 1 preferably further includes a first bearing chamber 14 located at another end of the shaft tube 11 opposite to the first end of the shaft tube 11.

The iron core 2 of the stator assembly includes an engagement channel 21 and a plurality of magnetically excited portions 22. The engagement channel 21 forms a first end 211 and a second end 212 in the axial direction, such that the shaft tube 11 can extend into the engagement channel 21 at the first end 211. In this case, the first open end 12 is located in the engagement channel 21. The iron core 2 includes a first side forming the first end 211 of the engagement channel 21, the first end abutting with the engagement shoulder 13. As a result, the iron core 2 can be stably disposed on the lower bearing seat 1. The magnetically excited portions 22 surround the engagement channel 21. Each of the magnetically excited portions 22 includes a magnetic pole 221 and a winding 222. The magnetic pole 221 extends in a radial direction perpendicular to the axial direction. The winding 222 is wound around the magnetic pole 221. In addition, the first bearing chamber 14 has a diameter W1 in the radial direction perpendicular to the shaft tube 11. The diameter W1 is larger than a diameter W2 of the first end 211 of the engagement channel 21 in the radial direction.

The upper bearing seat 3 of the stator assembly includes a fixing portion 31 and a receiving portion 32. The fixing portion 31 extends into the engagement channel 21 at the second end 212 of the engagement channel 21. The receiving portion 32 is located outside the engagement channel 21 and abuts with a second side of the iron core 2 forming the second end 212 of the engagement channel 21. The upper bearing seat 3 is preferably made of a metal material. The receiving portion 32 preferably includes a second bearing chamber 321 having a diameter W3 in the radial direction perpendicular to the shaft tube 11. The diameter W3 is larger than a diameter W4 of the second end 212 of the engagement channel 21 in the radial direction perpendicular to the shaft tube 11. The upper bearing seat 3 preferably includes an inclined inner guiding face 33 formed on the inner periphery of the upper bearing seat 3. The inclined inner guiding face 33 is in the form of an annular face formed on the inner face of the upper bearing seat 3. The annular face has a diameter gradually reduced from the receiving portion 32 to the fixing portion 31. Based on this, during the assembly of the outer-rotor motor, the shaft 6 can be more smoothly inserted through the engagement channel 21 at the inclined inner guiding face 33. An end of the fixing portion 31 extends into the engagement channel 21 and forms a second open end 34 of the upper bearing seat 3. The second open end 34 has an end face facing the first open end 12 of the lower bearing seat 1. In the embodiment, the end face of the second open end 34 is flat and in the form of a ring.

The first bearing 4 of the stator assembly is fixed to the lower bearing seat 1 and is received in the first bearing chamber 14. The second bearing 5 is fixed to the upper bearing seat 3 and is received in the second bearing chamber 321. In other words, both the first bearing 4 and the second bearing 5 are located outside the engagement channel 21. Since the first bearing 4 and the second bearing 5 are located outside the engagement channel 21, the winding length and the number of turns of the winding 222 can be properly increased without increasing the diameter of the stator assembly. Thus, the torque of the motor is increased.

Referring to FIG. 3, the first bearing 4 has a diameter W5 in the radial direction perpendicular to the axial direction, and the second bearing 5 has a diameter W6 in the radial direction perpendicular to the axial direction. The diameter W5 of the first bearing 4 is preferably larger than the diameter W2 of the first end 211 of the engagement channel 21. The diameter W6 of the second bearing 5 is preferably larger than the diameter W4 of the second end 212 of the engagement channel 21 in the radial direction perpendicular to the shaft tube 11. In such a manner, the engagement between the stator assembly and the rotor assembly can be reinforced. Furthermore, an inner periphery of the iron core 2 forms the engagement channel 21 and is press fit with the outer peripheries of the shaft tube 11 and the fixing portion 31. Therefore, the lower bearing seat 1 and the upper bearing seat 3 can be fixed in the proper positions relative to the iron core 2. However, an adhesion layer can be formed between the inner periphery of the iron core 2 and the outer periphery of the shaft tube 11, and/or between the inner periphery of the iron core 2 and the outer periphery of the fixing portion 31. This can improve the coupling strength between the iron core 2 and the lower and upper bearing seats 1 and 3. The shaft tube 11 of the lower bearing seat 1 and the fixing portion 31 of the upper bearing seat 3 are preferably spaced from each other in the axial direction, such that the receiving portion 32 can securely abut against the iron core 2 and couple with the outer periphery of the second end 212. Moreover, since the lower bearing seat 1 includes the engagement shoulder 13 and the upper bearing seat 3 includes the receiving portion 32, the engagement shoulder 13 and the receiving portion 32 can respectively abut against the first and second sides of the iron core 2 forming the first end 211 and the second end 212. As a result, the lower bearing seat 1, the iron core 2 and the upper bearing seat 3 are securely coupled together. The three elements can be coupled together in a manner preciously described, such as press fitting, adhesion or both.

Referring to FIG. 3 again, the shaft 6 of the rotor assembly extends through the shaft tube 11 of the lower bearing seat 1 and the fixing portion 31 of the upper bearing seat 3. Two ends extending out of the engagement channel 21 are respectively coupled with the first bearing 4 and the second bearing 5. The housing 7 is connected to the shaft 6 and the magnet portion 8. The magnet portion 8 includes a magnetic inducing face 81 facing the iron core 2. Based on this, when the magnetically excited portions 22 are electrified to generate a magnetic force on the magnetic pole 221, the magnetically excited portions 22 and the magnetic effect between the magnetically excited portions 22 and the magnetic inducing face 81 can drive the rotor assembly to rotate. In addition, to prevent friction between the shaft 6, the shaft tube 11 and the fixing portion 31 from affecting the rotation of the shaft 6, the shaft 6 includes an extension section 61 extending through the engagement channel 21 and the first bearing 4. The extension section 61 has a maximal diameter preferably smaller than the minimal diameters of the shaft tube 11 and the fixing portion 31.

Based on the above structure, since the engagement channel 21 does not include any bearing, the shaft tube 11 and the fixing portion 31 may be disposed as close to the outer periphery of the shaft 6 as possible, so as to increase the winding length and the number of turns of the winding. Thus, the torque of the motor can be increased. Furthermore, since the first bearing 4 and the second bearing 5 are disposed outside the engagement channel 21, the number of turns of the winding 222 is not affected when it is necessary to change the sizes of the first bearing 4 and the second bearing 5. In addition, since the receiving portion 32 of the upper bearing seat 3 abuts against the second side of the iron core 2 forming the second end 212 of the engagement channel 21, the second bearing 5 can be stably received in the receiving portion 32 without being displaced relative to the iron core 2.

Figure 4:
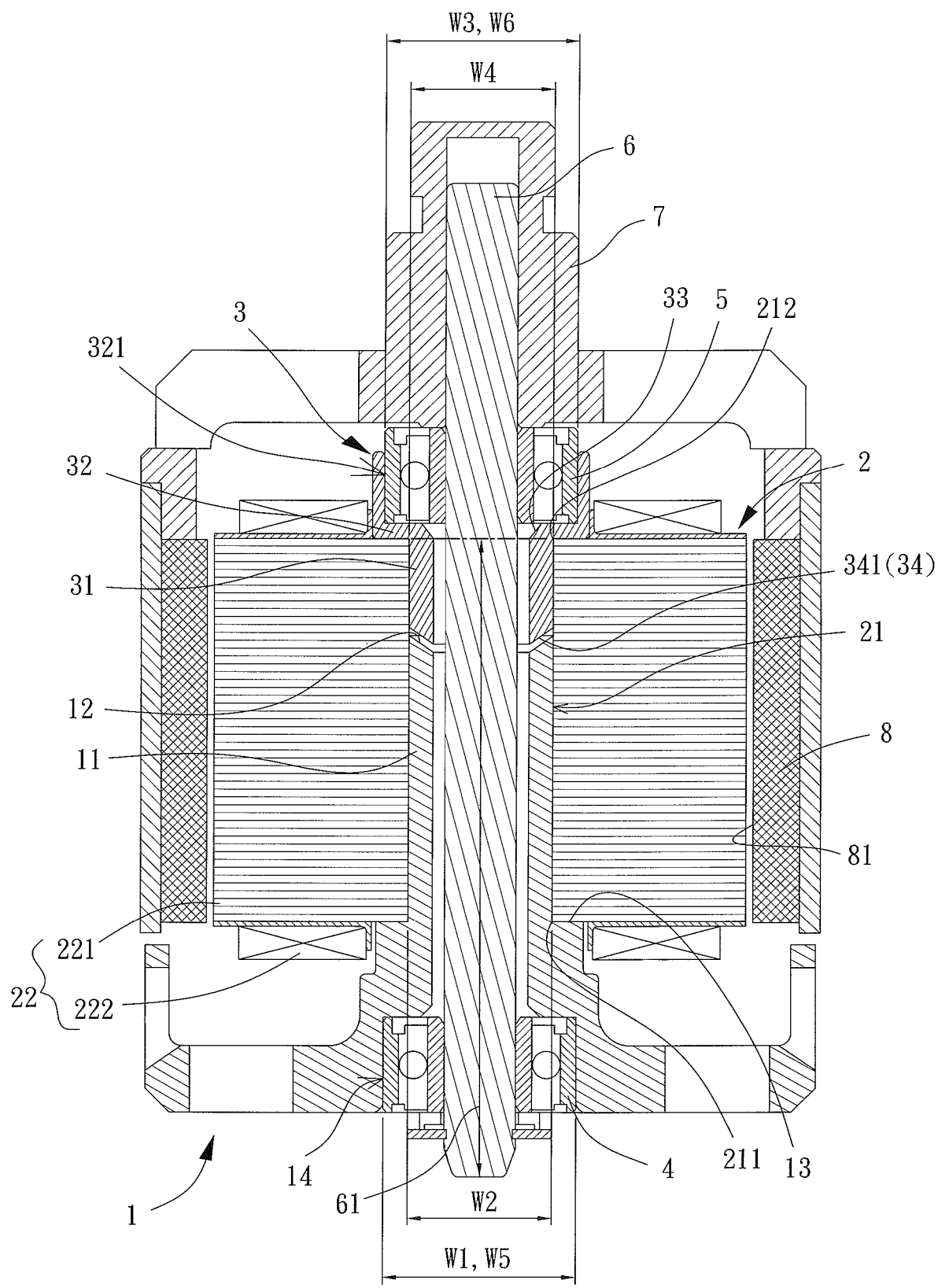
FIG. 4 is a cross sectional view of an outer-rotor motor according to a second embodiment of the invention after assembly.

FIG. 4 shows an outer-rotor motor according to a second embodiment of the invention. In comparison with the outer-rotor motor in the first embodiment, the second open end 34 of the upper bearing seat 3 in the second embodiment includes an outer inclined guiding face 341. The outer inclined guiding face 341 extends upwards and outwards in the radial direction perpendicular to the shaft 6. Therefore, during the assembly of the outer-rotor motor, the second open end 34 of the upper bearing seat 3 can be more easily guided into the engagement channel 21 at the outer inclined guiding face 341. In this regard, the first open end 12 of the lower bearing seat 1 may have a shape corresponding to the shape of the outer inclined guiding face 341. Namely, the first open end 12 of the lower bearing seat 1 may extend upwards and inwards in the radial direction. Thus, the effect of the upper bearing seat 3 abutting against the iron core 2 will not be affected by the mutual interference between the first open end 12 and the outer inclined guiding face 341.

Figure 5:
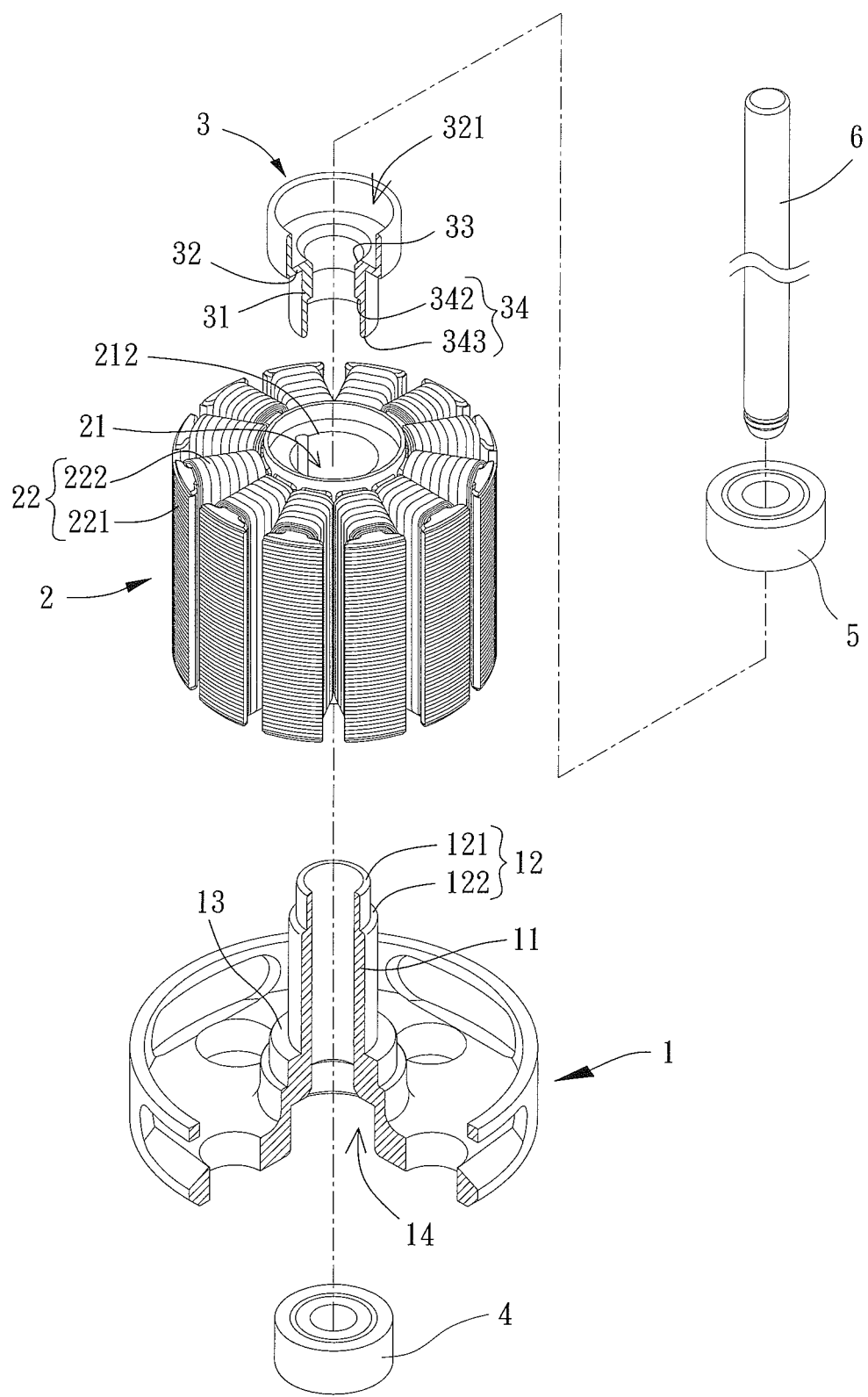
FIG. 5 is an exploded, perspective view of a stator assembly and a portion of a rotor assembly of an outer-rotor motor according to a third embodiment of the invention.
Figure 6:
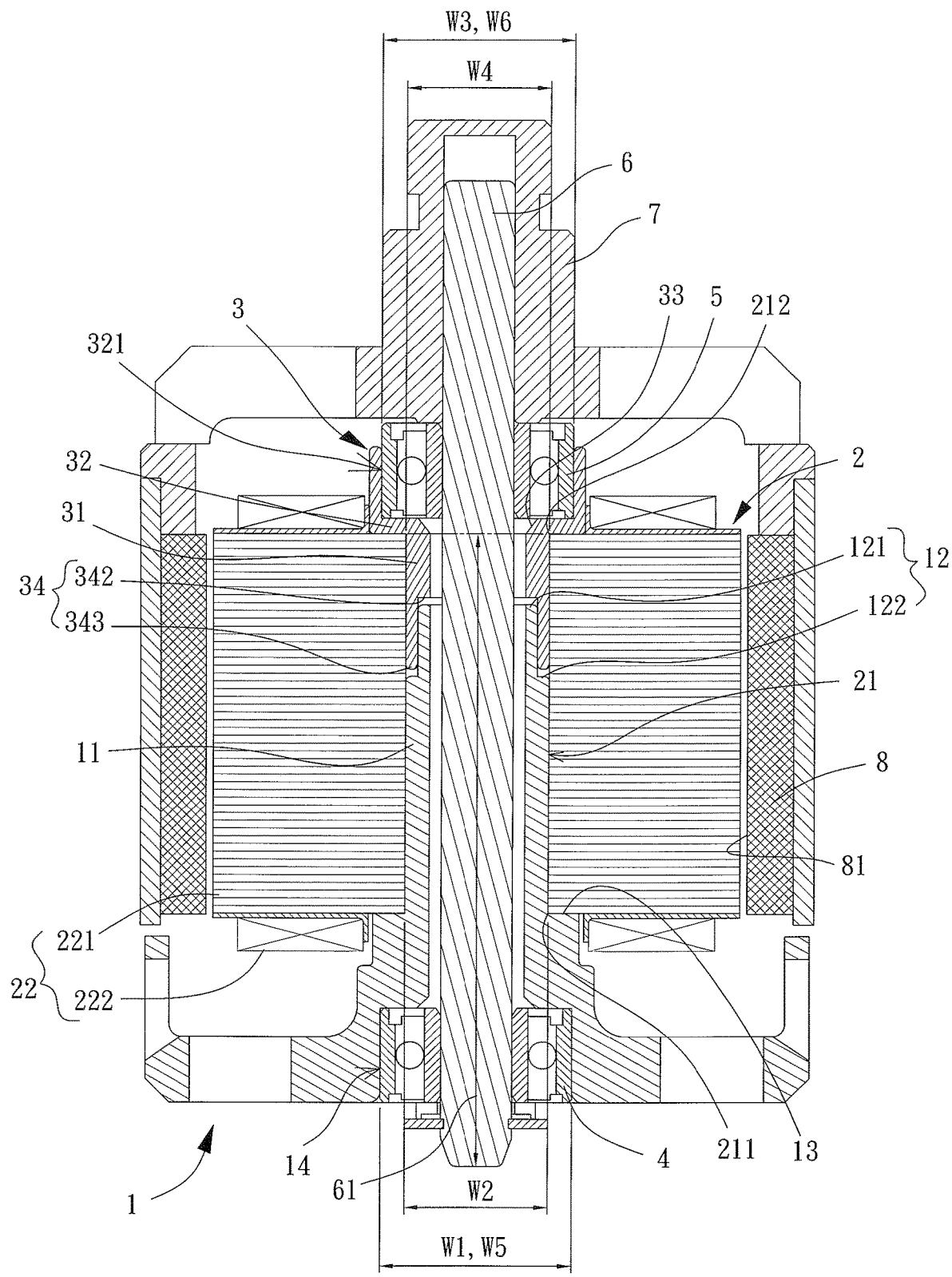
FIG. 6 is a cross sectional view of the outer-rotor motor according to the third embodiment of the invention after assembly.
Figure 7:
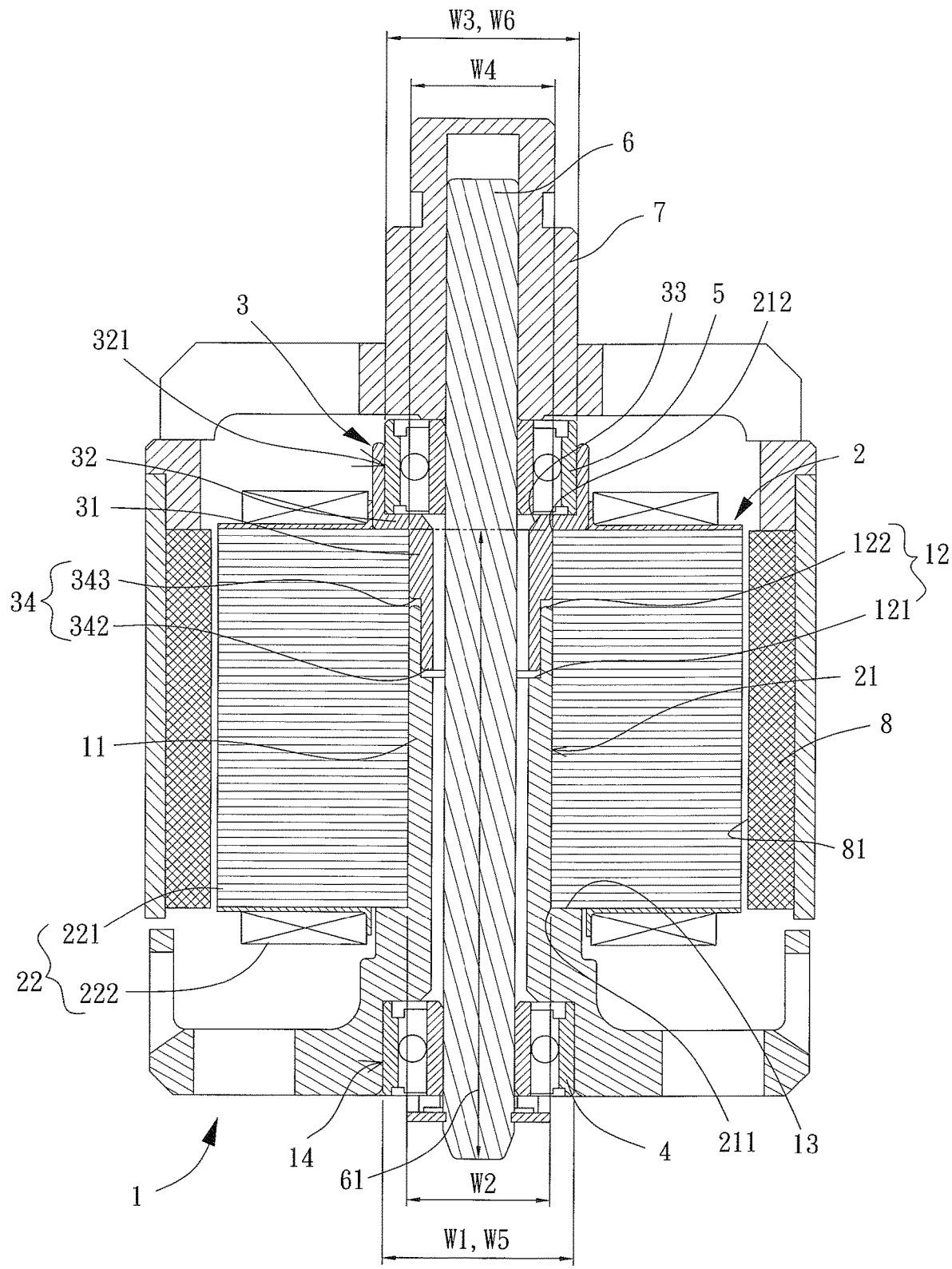
FIG. 7 is a cross sectional view of the outer-rotor motor of the third embodiment of the invention according to another implementation.

FIGS. 5-7 show an outer-rotor motor according to a third embodiment of the invention. As compared with the outer-rotor motors of the first and second embodiments, the first open end 12 of the lower bearing seat 1 in the third embodiment forms an inner top face 121 and an outer top face 122 in the radial direction of the shaft tube 11. A height difference exists between the inner top face 121 and the outer top face 122 in the axial direction of the shaft tube 11. In addition, the second open end 34 of the upper bearing seat 3 also forms an inner face 342 and an outer face 343 in the radial direction of the shaft tube 11. There is also an axial difference between the inner face 342 and the outer face 343 in the axial direction of the shaft tube 11. The inner face 342 faces the inner top face 121, and the outer face 343 faces the outer top face 122. Furthermore, the length between the inner top face 121 and the outer top face 122 in the axial direction preferably overlaps with the length between the inner face 342 and the outer face 343 in the axial direction perpendicular to the shaft 6. Specifically, referring to FIG. 6, the inner top face 121 is axially located between the inner face 342 and the outer face 343. Thus, a portion of the fixing portion 31 is clamped between the shaft tube 11 and the iron core 2. However, as shown in FIG. 7, the outer top face 122 can also be axially located between the inner face 342 and the outer face 343, so that a portion of the shaft tube 11 is clamped between the fixing portion 31 and the iron core 2. Based on this, the part of the upper bearing seat 3 that extends into the engagement channel 21 can have a larger length, such that the upper bearing seat 3 can be more securely coupled with the iron core 2.

Figure 8:
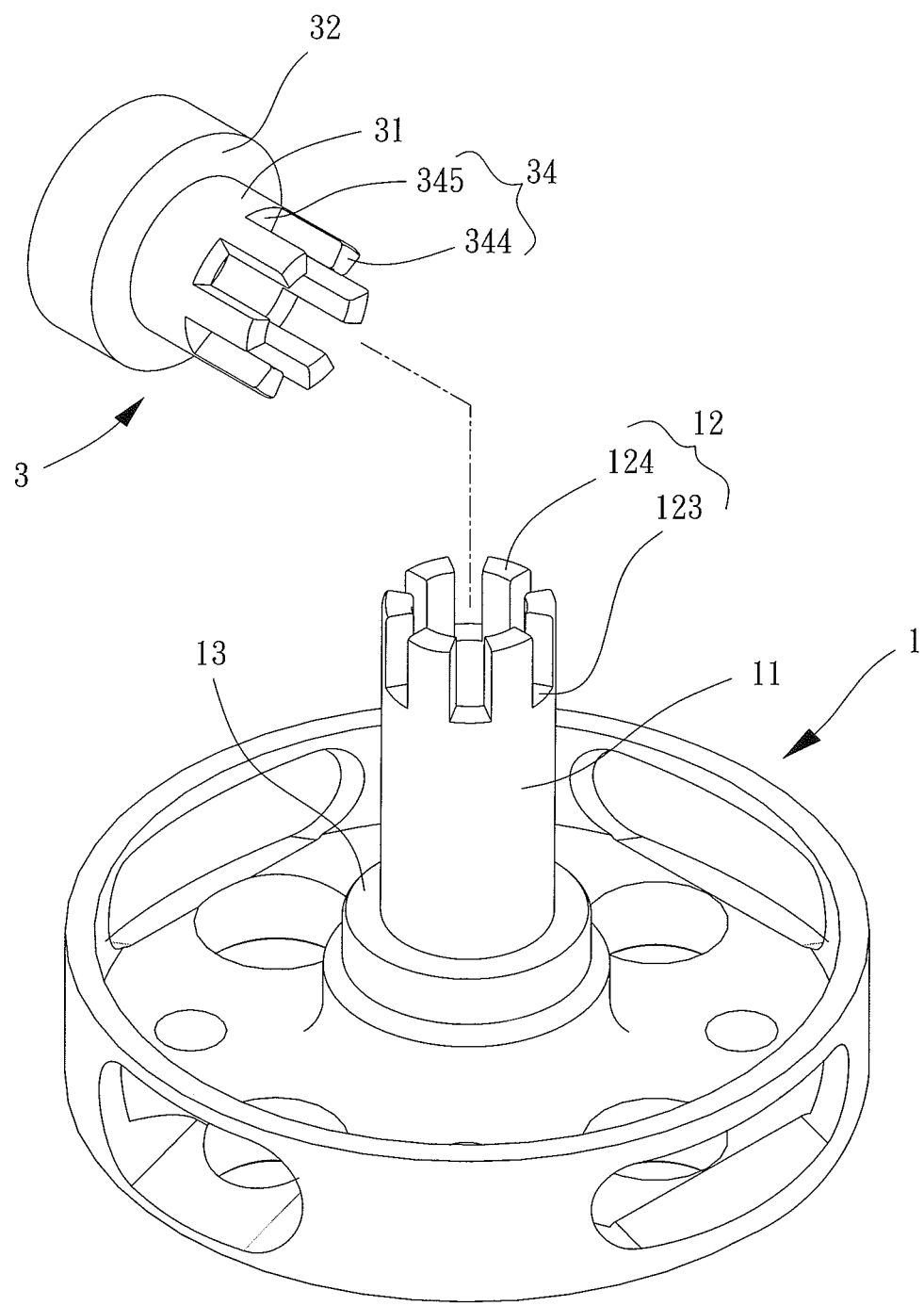
FIG. 8 is an exploded, perspective view of a lower bearing seat and an upper bearing seat of an outer-rotor motor according to a fourth embodiment of the invention.

FIG. 8 shows an outer-rotor motor according to a fourth embodiment of the invention. As compared with the outer-rotor motors of the first and second embodiments, the outer periphery of the shaft tube 11 includes at least one first top face 123 and at least one second top face 124 alternating with the at least one first top face 123 at the first open end 12 of the lower bearing seat 1. There is a height difference between the first top face 123 and the second top face 124. Besides, the outer periphery of the fixing portion 31 also includes at least one toothed top 344 and at least one toothed bottom 345 alternating with the at least one toothed top 344 at the second open end 34. There is also a height difference between the toothed top 344 and the toothed bottom 345 in the axial direction of the shaft tube 11. The toothed top 344 faces the first top face 123, and the toothed bottom 345 faces the second top face 124. Moreover, the length between the first top face 123 and the second top face 124 preferably overlaps with the length between the toothed top 344 and the toothed bottom 345 in a circumferential direction. Based on this, the part of the upper bearing seat 3 that extends into the engagement channel 21 can have a larger length, such that the upper bearing seat 3 can be more securely coupled with the iron core 2.

Figure 9:
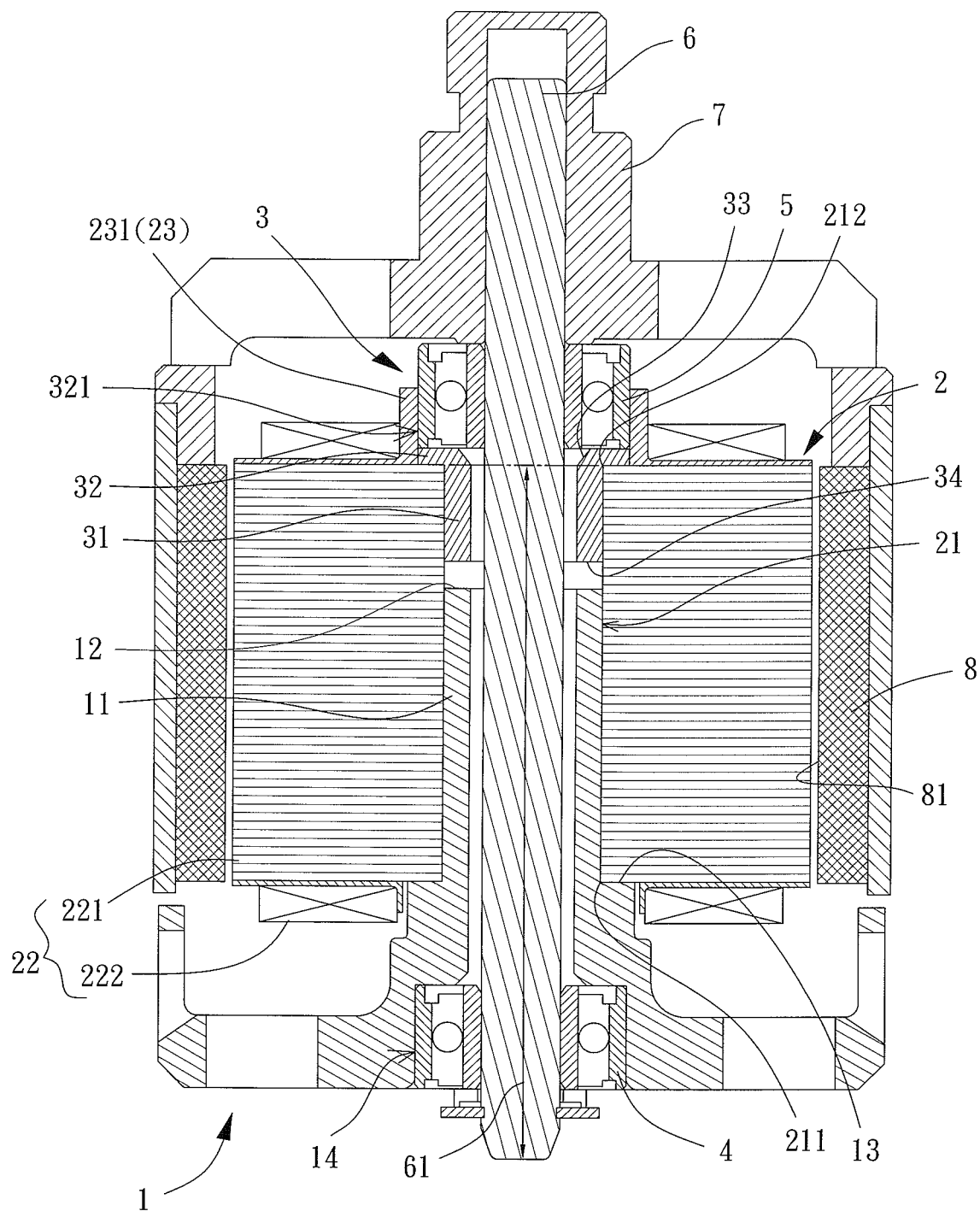
FIG. 9 is a cross sectional view of an outer-rotor motor according to a fifth embodiment of the invention after assembly.

FIG. 9 shows an outer-rotor motor according to a fifth embodiment of the invention. As compared with the outer-rotor motors of the previous embodiments, the receiving portion 32 of the upper bearing seat 3 is simply a circular board, and the iron core 2 includes an insulating sleeve 23 which is partially located between the magnetic poles 221 and the windings 222. In addition, the insulating sleeve 23 includes a face facing the upper bearing seat 3 and forming a lateral wall portion 231, such that the circular-shaped receiving portion 32 and the lateral wall portion 231 jointly form the second bearing chamber 321. Preferably, the insulating sleeve 23 integrally envelops the magnetic poles 221 by plastic injection molding. Then, the windings 222 can be wound around the insulating sleeve 23. Besides, the outer periphery of the second bearing 5 is preferably flush with the outer periphery of the receiving portion 32. The outer periphery of the second bearing 5 can also be slightly outward of the outer periphery of the receiving portion 32 in the radial direction, so that the outer periphery of the second bearing 5 can securely abut against the lateral wall portion 231. Based on the above structure, the structure of the upper bearing seat 3 can be simplified without affecting the structural strength.

Based on the above, the outer-rotor motors and the stator assemblies thereof can provide a bearing structure with convenient assembly. Besides, the torque of the motor can be increased by increasing the winding space without increasing the maximal diameter of the stator assembly. Furthermore, even if it is required to change the sizes of the first bearing 4 and the second bearing 5, it will not affect the number of turns of the windings 222. In this regard, the sizes of the first bearing 4 and the second bearing 5 can be properly increased to increase the structural strength, so as to increase the torque of the motor. Thus, the motor can rotate stably and have a prolonged service life. Moreover, since the receiving portion 32 of the upper bearing seat 3 abuts against the second side of the iron core 2 forming the second end 212 of the engagement channel 21, the second bearing 5 can be stably received in the receiving portion 32 without displacing relative to the iron core 2. Thus, the engagement reliability of the second bearing 5 can be reinforced.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A stator assembly of an outer-rotor motor, comprising:
a lower bearing seat having a shaft tube and includes an open end;
an iron core having an engagement channel and coupled with the lower bearing seat; and
an upper bearing seat having a fixing portion, with the upper bearing seat abutting against the iron core,
wherein the shaft tube extends into the engagement channel at a first end of the engagement channel, wherein the fixing portion extends into the engagement channel at a second end of the engagement channel, wherein the iron core is coupled with the upper and lower bearing seats, wherein the open end of the lower bearing seat is located at an end of the shaft tube and in the engagement channel, wherein the upper bearing seat includes an open end located in the engagement channel, wherein the open end of the lower bearing seat forms an inner top face and an outer top face in a radial direction perpendicular to an axial direction of the shaft tube, wherein the open end of the upper bearing seat further forms an inner face and an outer face in the radial direction perpendicular to the axial direction of the shaft tube, and wherein the inner face faces the inner top face and the outer face faces the outer top face.

2. A stator assembly of an outer-rotor motor, comprising:
a lower bearing seat having a shaft tube, the shaft tube having an inner periphery and an outer periphery;
an iron core having an engagement channel and coupled with the lower bearing seat, wherein the engagement channel of the iron core is delimited by the inner periphery of the shaft tube;
an upper bearing seat having a fixing portion, with the upper bearing seat abutting against the iron core,
wherein the shaft tube extends into the engagement channel at a first end of the engagement channel, wherein the fixing portion extends into the engagement channel at a second end of the engagement channel, and wherein the iron core is coupled with the upper and lower bearing seats;
a first bearing mounted to the lower bearing seat and located at one side of the iron core and entirely outside the engagement channel; and
a second bearing mounted to the upper bearing seat and located at another side of the iron core and entirely outside the engagement channel,
wherein an inner periphery of each of the first and second bearings is spaced from a central axis of the shaft tube shorter than the inner periphery of the shaft tube is to the central axis, and wherein an outer periphery of each of the first and second bearings is spaced from the central axis of the shaft tube farther than the outer periphery of the shaft tube is to the central axis,
wherein the lower bearing seat includes an open end located at an end of the shaft tube and in the engagement channel,
wherein the upper bearing seat includes an open end located in the engagement channel, wherein the shaft tube has an outer periphery forming at least one first top face and at least one second top face alternating with the at least one first top face at the open end of the lower bearing seat, wherein the fixing portion has an outer periphery forming at least one toothed top and at least one toothed bottom alternating with the at least one toothed top at the open end of the upper bearing seat, and wherein the toothed top faces the first top face and the toothed bottom faces the second top face.

3. The stator assembly of the outer-rotor motor as claimed in claim 2, wherein the lower bearing seat includes a first bearing chamber located outside the engagement channel, wherein the first bearing is received in the first bearing chamber, wherein the first bearing chamber has a diameter in a radial direction perpendicular to the shaft tube, and wherein the diameter is larger than a diameter of the first end of the engagement channel in the radial direction.

4. The stator assembly of the outer-rotor motor as claimed in claim 2, wherein the fixing portion extends into the engagement channel at the second end of the engagement channel, wherein the upper bearing seat includes a second bearing chamber located outside the engagement channel, wherein the second bearing is received in the second bearing chamber, wherein the second bearing chamber has a diameter in a radial direction perpendicular to the shaft tube, and wherein the diameter is larger than a diameter of the second end of the engagement channel in the radial direction.

5. The stator assembly of the outer-rotor motor as claimed in claim 2, wherein the iron core includes an inner periphery forming the engagement channel, and wherein the shaft tube and the fixing portion are press fitted with the inner periphery of the iron core.

6. The stator assembly of the outer-rotor motor as claimed in claim 2, wherein the iron core includes an inner periphery forming the engagement channel, and wherein an adhesion layer is formed between the inner periphery of the iron core and an outer periphery of the shaft tube.

7. The stator assembly of the outer-rotor motor as claimed in claim 2, wherein the iron core includes an inner periphery forming the engagement channel, and wherein an adhesion layer is formed between the inner periphery of the iron core and an outer periphery of the fixing portion.

8. The stator assembly of the outer-rotor motor as claimed in claim 2, wherein the shaft tube and the fixing portion are spaced from each other in an axial direction of the shaft tube.

9. The stator assembly of the outer-rotor motor as claimed in claim 2, wherein the lower bearing seat forms an engagement shoulder on an outer periphery of the shaft tube, and wherein the iron core includes a side forming the first end of the engagement channel and abutting with the engagement shoulder.

10. The stator assembly of the outer-rotor motor as claimed in claim 2, wherein the upper bearing seat includes a receiving portion connected to the fixing portion, located outside the engagement channel, with the receiving portion abutting against the iron core.

11. The stator assembly of the outer-rotor motor as claimed in claim 2, wherein the open end of the upper bearing seat includes an outer inclined guiding face.

12. A stator assembly of an outer-rotor motor, comprising:
a lower bearing seat having a shaft tube, the shaft tube having an inner periphery and an outer periphery;
an iron core having an engagement channel and coupled with the lower bearing seat, wherein the engagement channel of the iron core is delimited by the inner periphery of the shaft tube;
an upper bearing seat having a fixing portion, with the upper bearing seat abutting against the iron core,
wherein the shaft tube extends into the engagement channel at a first end of the engagement channel, wherein the fixing portion extends into the engagement channel at a second end of the engagement channel, and wherein the iron core is coupled with the upper and lower bearing seats;

a first bearing mounted to the lower bearing seat and located at one side of the iron core and entirely outside the engagement channel; and a second bearing mounted to the upper bearing seat and located at another side of the iron core and entirely outside the engagement channel, wherein an inner periphery of each of the first and second bearings is spaced from a central axis of the shaft tube shorter than the inner periphery of the shaft tube is to the central axis, and wherein an outer periphery of each of the first and second bearings is spaced from the central axis of the shaft tube farther than the outer periphery of the shaft tube is to the central axis, wherein the iron core includes an insulating sleeve having a face facing the upper bearing seat and forming a lateral wall portion, and wherein the second bearing abuts against the lateral wall portion.

13. The stator assembly of the outer-rotor motor as claimed in claim 12, wherein the upper bearing seat includes a receiving portion in a form of a circular board, wherein the receiving portion is connected to the fixing portion and located outside the engagement channel, wherein the receiving portion abuts against the iron core, and wherein the receiving portion and the lateral wall portion jointly receive the second bearing.

* * * * *